(12) United States Patent
Kaneshige et al.

(10) Patent No.: US 10,122,234 B2
(45) Date of Patent: Nov. 6, 2018

(54) STATOR FOR ROTARY ELECTRIC MACHINE

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Keiichi Kaneshige, Seto (JP); Masashi Matsumoto, Nagoya (JP); Kuniyoshi Shishido, Anjo (JP); Atsushi Watanabe, Toyota (JP); Kazuhiro Goto, Toyota (JP); Akihito Koike, Kariya (JP); Tetsuya Maruyama, Kariya (JP)

(73) Assignees: TOYOTA JIDOSHA KABUSHIKI KAISHA, Toyota-shi, Aichi-ken (JP); DENSO CORPORATION, Kariya-shi, Aichi-ken (JP)

( * ) Notice: Subject to any disclaimer, the term of this patent is extended or adjusted under 35 U.S.C. 154(b) by 94 days.

(21) Appl. No.: 14/755,611

(22) Filed: Jun. 30, 2015

(65) Prior Publication Data

US 2016/0006314 A1 Jan. 7, 2016

(30) Foreign Application Priority Data

Jul. 1, 2014 (JP) .................................. 2014-135599

(51) Int. Cl.
*H02K 3/50* (2006.01)
*H02K 3/12* (2006.01)
(Continued)

(52) U.S. Cl.
CPC ................. *H02K 3/50* (2013.01); *H02K 3/12* (2013.01); *H02K 3/28* (2013.01); *H02K 3/48* (2013.01);
(Continued)

(58) Field of Classification Search
CPC .. H02K 3/50; H02K 3/38; H02K 3/28; H02K 3/12; H02K 15/0081; H02K 3/48; H02K 11/25; H02K 2203/06
(Continued)

(56) References Cited

U.S. PATENT DOCUMENTS 4,367,425 A * 1/1983 Mendelsohn ........... C08L 31/08
174/DIG. 20
5,508,571 A * 4/1996 Shafer, Jr. ................ H02K 3/28
310/179
(Continued)

FOREIGN PATENT DOCUMENTS

JP 2004-104996 A 4/2004
JP 2006-121884 A 5/2006
(Continued)

*Primary Examiner* — Naishadh Desai
(74) *Attorney, Agent, or Firm* — Sughrue Mion, PLLC

(57) ABSTRACT

A stator includes a stator core, a plurality of phase windings, a neutral line and a fixing portion. The plurality of phase windings is wounded a plurality of times by a predetermined winding method crossing between a plurality of slots. One lead end of each phase winding is a neutral point connecting portion, and the one lead end is pulled out from an axially end portion of the stator core. The neutral line connects the neutral point connecting portions of the phase windings of different phases together. The neutral line is separate from the phase windings. The fixing portion fixes a first phase winding that is connected to the neutral line. A second phase winding is adjacent to the first phase winding together.

8 Claims, 5 Drawing Sheets

(51) Int. Cl.
*H02K 3/28* (2006.01)
*H02K 15/00* (2006.01)
*H02K 3/48* (2006.01)
*H02K 11/25* (2016.01)

(52) U.S. Cl.
CPC ......... *H02K 11/25* (2016.01); *H02K 15/0081* (2013.01); *H02K 2203/06* (2013.01)

(58) Field of Classification Search
USPC .................................................... 310/71, 216
See application file for complete search history.

(56) References Cited

U.S. PATENT DOCUMENTS

| | | | | |
|---|---|---|---|---|
| 6,204,586 | B1* | 3/2001 | Umeda | H02K 3/12 |
| | | | | 310/179 |
| 6,791,227 | B2* | 9/2004 | Yasuhara | H02K 3/12 |
| | | | | 310/179 |
| 2001/0026109 | A1 | 10/2001 | Higashino et al. | |
| 2002/0033649 | A1* | 3/2002 | Oohashi | H02K 3/28 |
| | | | | 310/184 |
| 2006/0185152 | A1 | 8/2006 | Oohashi et al. | |
| 2009/0189309 | A1 | 7/2009 | Matsubayashi et al. | |
| 2012/0019081 | A1* | 1/2012 | Tamura | H02K 3/12 |
| | | | | 310/43 |
| 2012/0027629 | A1* | 2/2012 | Tanahashi | F04D 5/002 |
| | | | | 417/410.1 |
| 2015/0200575 | A1 | 7/2015 | Tsuiki et al. | |

FOREIGN PATENT DOCUMENTS

| | | | | |
|---|---|---|---|---|
| JP | 2006-204068 | A | | 8/2006 |
| JP | 2008125170 | A | * | 5/2008 |
| JP | 4593291 | B2 | | 12/2010 |
| JP | 2011-217524 | A | | 10/2011 |
| JP | 2012-029355 | A | | 2/2012 |
| JP | 2013-121183 | A | | 6/2013 |
| WO | 2014/034712 | A1 | | 3/2014 |

* cited by examiner

STATOR FOR ROTARY ELECTRIC MACHINE

INCORPORATION BY REFERENCE

The disclosure of Japanese Patent Application No. 2014-135599 filed on Jul. 1, 2014 including the specification, drawings and abstract is incorporated herein by reference in its entirety.

BACKGROUND OF THE INVENTION

1. Field of the Invention

The invention relates to a stator for a rotary electric machine, and more particularly, to a stator for a rotary electric machine, in which ends of phase windings are connected at a neutral point (i.e., one end of one phase winding is connected to one end of another phase winding at a neutral point).

2. Description of Related Art

In a stator of a three-phase rotary electric machine, phase windings are wound by a predetermined winding method. A Δ connection and a Y connection are known methods to connect phase windings together. With a Y connection, ends of phase windings are connected at a neutral point (i.e., one end of one phase winding is connected to one end of another phase winding at a neutral point).

In related art, one end of each phase winding is pulled out, and the pulled out end portions of the phase windings are twisted together, for example, to form a neutral point. For example, Japanese Patent Application Publication No. 2006-121884 (JP 2006-121884 A) describes a structure in which a wound portion formed by a stator coil that is wound through slots in a motor stator is provided, and wires that are supplied with phase currents of the phases protrude out from an upper portion of the wound portion, and neutral lines protrude out from a lower portion of the wound portion. Here, a portion of each of the three neutral lines at the lower portion of the wound portion is stripped of an insulation layer, and these stripped portions are overlapped and welded together.

Also, Japanese Patent Application Publication No. 2004-104996 (JP 2004-104996 A) describes pulling out end portions of three different phase coils as neutral point lead portions, placing the pulled out lead portions along an upper portion of a coil end group, and fixing the lead portions to the coil end group by insulated cloth tubing+adhesive, cloth sheet+adhesive, or partial adhesive or the like.

One method of forming the phase coils is to use a plurality of conductor segments that have been formed in U-shapes or the like beforehand. With this method, the conductor segments are bent into a predetermined shape and end portions of the conductor segments are sequentially connected together by welding. In this case, flat wire having a rectangular cross-section may be used as the conductor segments. In this way, when employing a method of connecting the end portions of a plurality of conductor segments of flat wire together by welding, assembly is easier using a neutral line that is separate from the phase windings, than forming a neutral point by twisting the end portions of the flat wires together. That is, the pulled out end portions of the flat wires are welded and connected together via the neutral line.

For example, Japanese Patent Application Publication No. 2012-29355 (JP 2012-29355 A) describes fixing two neutral lines and three interphase wires that are separate from the phase windings together by adhesive, in a coil end of a stator of a rotary electric machine.

Also, Japanese Patent Application Publication No. 2013-121183 (JP 2013-121183 A) proposes a structure in which a neutral line that is attached by welding to a stator of a rotary electric machine is able to be easily replaced when a temperature detection element provided on the neutral line fails. More specifically, a tip end length of a neutral line weld zone to be welded to a neutral line, of an end portion weld zone of conductor segments that form a stator coil, is made twice as long as a same-phase weld zone.

When a neutral line that is separate from the phase windings is used to connect ends of phase windings at a neutral point (i.e., one end of one phase winding to one end of another phase winding at a neutral point) in a stator for a rotary electric machine, the neutral line is connected and arranged in a state floating between ends that have been pulled out from the phase windings (hereinafter, referred to as "lead ends"). When using a conductor segment, the free end of each phase winding is a free end of the conductor segment, so the neutral line is connected and arranged in a state floating between the two free ends. A resonant frequency of vibration of a portion of the neutral line that is connected in the floating state in this way is a frequency that is lower than a natural frequency of vibration of the stator core and a natural frequency of vibration of an assembly of phase windings wound around the stator core, and tends to resonate with external vibration. For example, in a case such as when the rotary electric machine is mounted in a hybrid vehicle, the neutral line may resonate at the frequency of the engine. If the neutral line resonates, the connecting point between the neutral line and the phase windings may separate, and operation of the rotary electric machine may become unstable.

SUMMARY OF THE INVENTION

The invention thus provides a stator for a rotary electric machine that is capable of preventing a neutral line and phase windings from resonating, thereby ensuring the reliability with which the neutral line is fixed to the phase windings, in a structure in which lead ends of phase windings are connected by a neutral line that is separate from the phase windings.

A stator related to the present invention is for a rotary electric machine. The stator includes a stator core, a plurality of phase windings, a neutral line and a fixing portion. The stator core includes a yoke portion on an outer peripheral side of the stator core. The stator core has a plurality of slots on an inner peripheral side of the stator core. The slots are arranged in a circumferential direction. The plurality of phase windings are wounded a plurality of times by a predetermined winding method crossing between the plurality of slots. One lead end of each phase winding is a neutral point connecting portion, and the one lead end is pulled out from an axially end portion of the stator core. The neutral line connects the neutral point connecting portions of the phase windings of different phases together. The neutral line is separate from the phase windings. The fixing portion fixes a first phase winding that is connected to the neutral line. A second phase winding that is adjacent to the first phase winding together.

In the stator for the rotary electric machine described above, each phase winding (the first phase winding) that is connected to the neutral line is fixed by the fixing portion to each adjacent phase winding (the second phase winding). The second phase winding is wound around the stator core. The natural frequency of the second phase winding itself is a much higher frequency than the resonant frequency of the portion of the neutral line that is in the floating state. Because the first phase winding is fixed to this kind of second phase winding, the resonant frequency of the connecting structure between the lead end of each phase winding and the neutral line is able to be increased. As a result, resonance with the engine and the like is able to be avoided, and so stable reliability with which the neutral line is fixed is able to be obtained.

The fixing portion may be a high viscosity adhesive which can be provided between the first phase winding and the second phase winding without running down.

With this structure, high viscosity adhesive that tends not to drip is used for the fixing portion, so a predetermined location is able to be precisely fixed.

The fixing portion may be a tablet adhesive that is in a solid state at room temperature, and fluidizes when heated.

The solid tablet adhesive is easier to handle than a fluid adhesive, and is thus able to be precisely arranged in a predetermined position.

The fixing portion may include a low viscosity adhesive and a tube. The tube is arranged between the first phase winding and the second phase winding, and the tube is impregnated with the low viscosity adhesive.

Using a tube that can be impregnated with adhesive enables a low viscosity adhesive to be used. A low viscosity adhesive is a low viscosity varnish used to assemble the rotary electric machine or the like, for example. According to this structure, a predetermined location is able to be precisely fixed while using the varnish as it is, and the resonant frequency of the connecting structure between the lead end of each phase winding and the neutral line is able to be increased.

The fixing portion may be a sheet member that is inserted between the first phase winding and the second phase winding. The sheet member is in a solid state at room temperature, and melts when heated, and cures by being heated further.

The solid sheet adhesive is easier to handle than a fluid adhesive, and is thus able to be precisely arranged in a predetermined position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
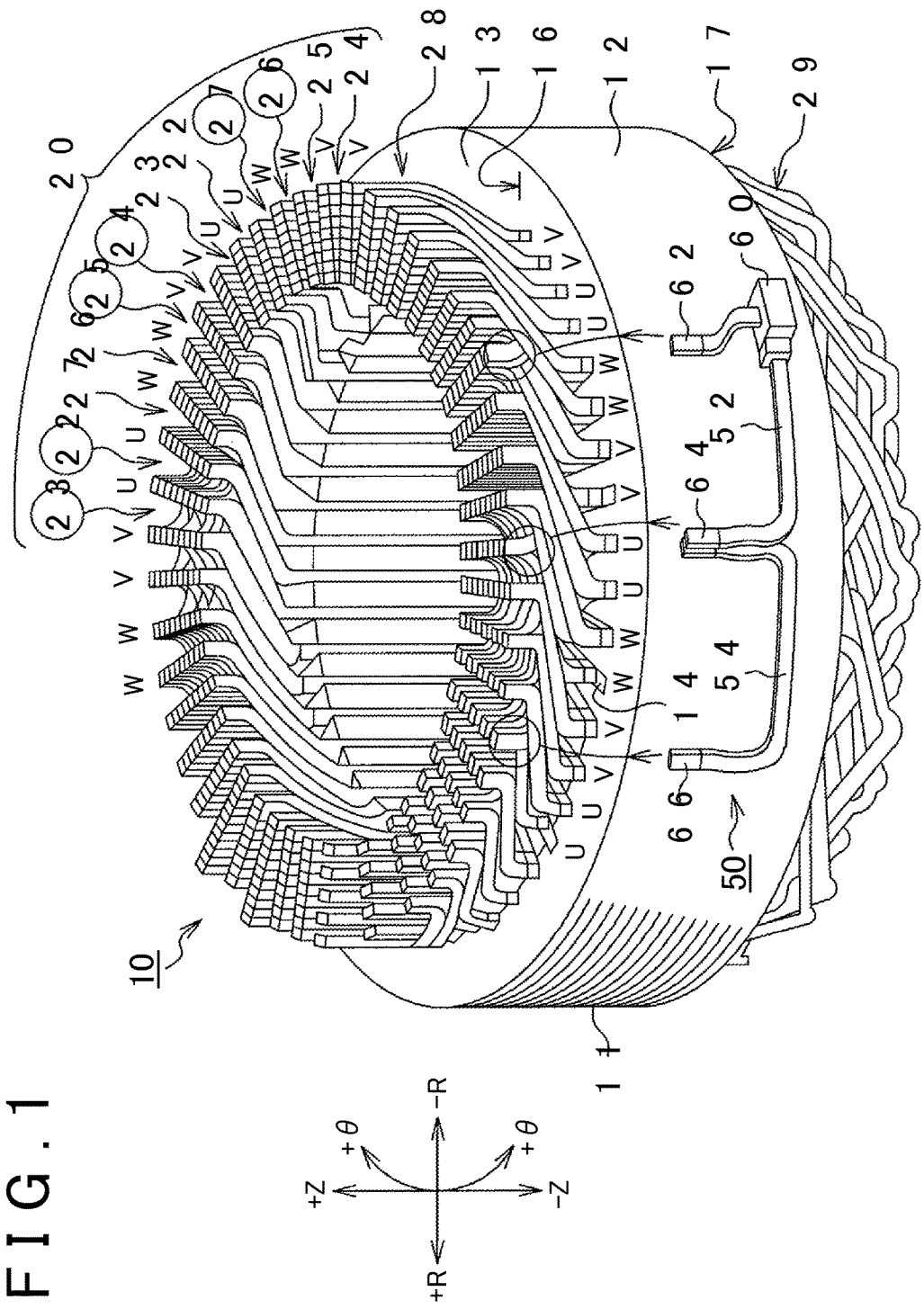
FIG. 1 is a view of an arrangement of a neutral line in a stator for a rotary electric machine according to one example embodiment of the invention.

Example embodiments of the invention will hereinafter be described in detail with reference to the accompanying drawings. In the description below, the winding method of phase windings is a distributed winding method, the phase windings are formed by a plurality of conductor segments, and the conductor segments are made using flat wire with an insulation coating. However, this is merely an example for descriptive purposes. Another structure may also be used as long as it is a structure in which the phase windings are wound around a stator core, and one end of each phase winding is pulled out in order to be connected to a neutral line. For example, the structure may also be such that a winding having a circular cross-section or an elliptical cross-section is wound around a stator core.

The dimensions, shapes, and materials and the like described below are for descriptive purposes only, and may be changed as appropriate according to the specifications of the stator for the rotary electric machine. In the description below, like elements in all of the drawings will be denoted by like reference characters, and redundant descriptions of those elements will be omitted.

FIG. 1 is a view of a stator 10 for a rotary electric machine. This stator 10 for a rotary electric machine will hereinafter simply be referred to as "stator 10". The rotary electric machine that uses this stator 10 is a three-phase rotary electric machine that is a motor-generator which functions as an electric motor when a vehicle is powered, and functions as a generator when the vehicle is braking. The rotary electric machine includes the stator 10 shown in FIG. 1, and a rotor arranged to the inner peripheral side of, and separated by a predetermined gap from, the stator 10. A circumferential direction θ, a radial direction R, and an axial direction Z of the stator 10 are indicated in FIG. 1. In the circumferential direction θ, the clockwise direction in FIG. 1 is a +θ direction, and the counterclockwise direction in FIG. 1 is a −θ direction. In the radial direction R, the direction toward the outer peripheral side is a +R direction, and the direction toward the inner peripheral side is a −R direction. In the axial direction Z, the direction toward the top of FIG. 1 is a +Z direction, and the direction toward the bottom of FIG. 1 is a −Z direction.

The stator 10 includes a stator core 12, phase windings 20 that are wound around the stator core 12, and a neutral line 50.

The stator core 12 is an annular magnetic part having a yoke portion 13 on an outer peripheral side, and a plurality of winding insertion slots 14 arranged in the circumferential direction on an inner peripheral side. A stacked body formed by a plurality of annular-shaped magnetic thin plates 11 formed in a predetermined shape, including the slots 14, and stacked together, is used for the stator core 12. Electromagnetic steel plates may be used as the magnetic thin plates 11. Instead of the stacked body of magnetic thin plates 11, magnetic powder may also be integrally formed into a predetermined shape.

The phase windings 20 are three-phase windings that are wound, by a predetermined distributed winding method, around the stator core 12. The phase windings, i.e., U-phase windings 22 and 23, V-phase windings 24 and 25, and W-phase windings 26 and 27, are wound around the stator 10 of the three-phase rotary electric machine. The phase windings 20 of the distributed winding are wound crossing between two slots that are separated by a predetermined number of slots (i.e., a predetermined slot interval), of the plurality of slots 14 that are provided in the circumferential direction on the inner peripheral side of the stator core 12. In FIG. 1, slots that the U-phase windings 22 and 23 are wound crossing between will be denoted by a "U", slots that the V-phase windings 24 and 25 are wound crossing between will be denoted by a "V", and slots that the W-phase windings 26 and 27 are wound crossing between will be denoted by a "W".

In the example shown in FIG. 1, with regards to the plurality of slots 14, slots 14 for each of the different phases are arranged such that same phases are separated by six slots as the predetermined slot interval. Because of this six slot interval, when there are three phases, the arrangement of the slots 14 in the circumferential direction of the stator core 12 is, in order in the clockwise direction, a slot for the U-phase winding 23, a slot for the U-phase winding 22, a slot for the W-phase winding 27, a slot for the W-phase winding 26, a slot for the V-phase winding 25, and a slot for the V-phase winding 24, and this arrangement is repeating. The circles around the phase windings 20 in FIG. 1 will be explained with reference to FIG. 5 that will be described later.

With the phase windings 20, a plurality of conductor segments cross between and are inserted through, from an axially end portion 17 on the other side of the stator core 12, two slots 14 that are separated by the six slot interval, and tip end portions of conductors protruding out from an axially end portion 16 on one side of the stator core 12 are joined sequentially according to a predetermined coil winding method, and wound in the circumferential direction. This is then repeated for a predetermined number of windings.

Each of the conductor segments crossing between and inserted through two slots that are separated by the predetermined slot interval is a single insulation-coated conductor formed having a general U-shape or a general V-shape. A general U-shape is a shape having two leg portions that extend straight, and a curved portion that connects the two leg portions together while separating them by a predetermined leg portion interval. The predetermined leg portion interval of the conductor segment is set to a six slot interval that is the predetermined slot interval.

Flat wire having a rectangular cross-section is used as the insulation-coated conductor used for the conductor segment. Using flat wire enables the coil space factor inside the slots 14 to be improved. The insulation-coated conductor is a conductor in which the outer periphery of wire is coated with an insulation coating. Copper wire, copper-tin alloy wire, silver-coated copper-tin alloy wire, or the like may be used as the wire. A polyamide-imide enamel coating is used as the insulation coating. Instead, however, a coating of polyester-imide, polyimide, polyester, or formal or the like may be used.

The bent portion of the conductor segment comes to the axially end portion 17 on the other side of the stator core 12, and the two leg portions are inserted into two slots 14 that are separated by the six slot interval from the axially end portion 17 on the other side of the stator core 12 toward the axially end portion 16 on the one side. The two leg portions protruding on the side of the axially end portion 16 on the one side are bent into a predetermined shape on the side of the axially end portion 16 on the one side, and are welded to the leg portions of another conductor segment of the same phase that is adjacent. This is repeated for same phases, and winding is performed until there are a predetermined number of windings in the circumferential direction of the stator core 12.

Portions where the leg portions of a plurality of conductor segments are sequentially connected protrude from the axially end portion 16 on the one side of the stator core 12 to form a coil end 28. The bent portions of the plurality of conductor segments protrude to form a coil end 29 on the axially end portion 17 on the other side.

In FIG. 1, with the U-phase, a winding that is wound five times around the stator core 12 is represented by the U-phase winding 22. When wound five times around, the winding fills up the entire length, from the outer peripheral side to the inner peripheral side, of one slot, so the winding is moved over one slot and wound another five times around. In FIG. 1, the winding that continues on from the U-phase winding 22 and is moved over one slot and wound the second five times around is represented by the U-phase winding 23. The U-phase windings 22 and 23 are not separate U-phase windings, but instead correspond to the first five times that the U-phase winding is wound, of the ten total times, and the second five times that the U-phase winding is wound after moving over one slot and continuing on. The V-phase windings 24 and 25 and the W-phase windings 26 and 27 are also similar in this respect. Five and ten for the number of times that the windings are wound are examples. The number of times that the windings are wound may also be another number.

In the example described above, one end of each phase winding that has been wound ten times is a circuit side connecting portion for connecting to each phase power line of a rotary electric machine driving circuit such as an inverter, not shown, and the other end is a neutral point connecting portion for forming a neutral point. In the description below, the neutral point connecting portion is provided on an end portion of the U-phase winding 22, the V-phase winding 24, and the W-phase winding 26, and the circuit side connecting portion is provided on an end portion of the U-phase winding 23, the V-phase winding 25, and the W-phase winding 27. An insulation coating removal process is performed in preparation for a weld connection, on the circuit side connecting portion and the neutral point connecting portion. The circuit side connecting portion, the neutral point connecting portion, and the neutral line 50 that is connected to the neutral point connecting portion, are provided on the side with the coil end 28 that protrudes from the axially end portion 16 on the one side of the stator core 12. The +Z direction side in the Z direction is the side of the stator core 12 with the coil end 28, and is the side where the neutral line 50 is connected.

Figure 2:
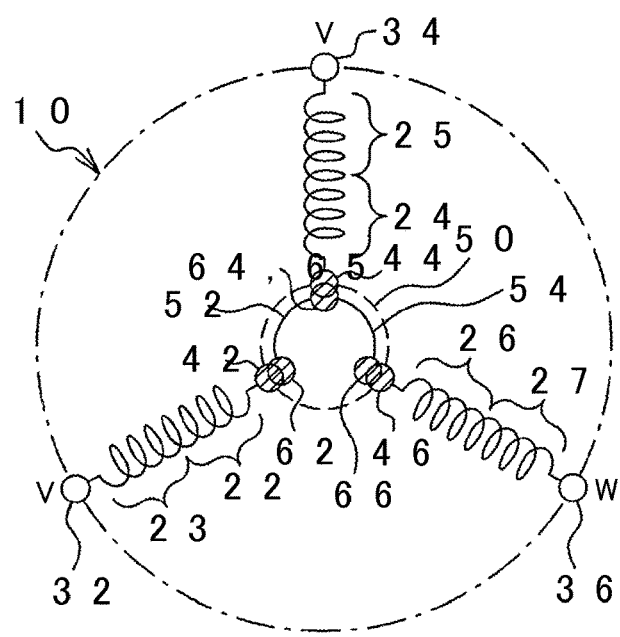
FIG. 2 is a view showing the relationship between the neutral line and phase windings in the stator for the rotary electric machine according to the example embodiment of the invention.

FIG. 2 is a view of the relationship between the neutral line 50, and a neutral point connecting portion 42 of the U-phase winding 22, a circuit side connecting portion 32 of the U-phase winding 23, a neutral point connecting portion 44 of the V-phase winding 24, a circuit side connecting portion 34 of the V-phase winding 25, a neutral point connecting portion 46 of the W-phase winding 26, and a circuit side connecting portion 36 of the W-phase winding 27, of the stator 10.

The neutral line 50 is an insulation-coated flat wire, similar to the phase windings 20, that has been formed in a predetermined shape. The neutral line 50 has a UV connecting wire 52 that connects the neutral point connecting portion 42 of the U-phase winding 22 to the neutral point connecting portion 44 of the V-phase winding 24, and a VW connecting wire 54 that connects the neutral point connecting portion 44 of the V-phase winding 24 to the neutral point connecting portion 46 of the W-phase winding 26.

The UV connecting wire 52 has insulation-coating removed portions 62 and 64 where the insulation coating has been removed on both end sides. The insulation-coating removed portion 62 is connected to the neutral point connecting portion 42 of the U-phase winding 22, and the insulation-coating removed portion 64 is connected to the neutral point connecting portion 44 of the V-phase winding 24. The VW connecting wire 54 also has insulation-coating removed portions 65 and 66 where the insulation coating has been removed on both end sides. The insulation-coating removed portion 65 is connected to the neutral point connecting portion 44 of the V-phase winding 24, and the insulation-coating removed portion 66 is connected to the neutral point connecting portion 46 of the W-phase winding 26.

The insulation-coating removed length of the circuit side connecting portion and the neutral point connecting portion of each phase winding 20 is the same length as the length (i.e., the insulation-coating removed length) of the insulation-coating removed portions 62, 64, 65, and 66 of the neutral line 50. As an example, the length is set to a length one to several times the length of a long side of the flat wire. For example, when the length of the long side of the flat wire is approximately 1 mm, the insulation-coating removed length is set to one to several millimeters. For the weld connection, TIG (Tungsten Inert Gas) welding may be used, whereby welding is performed by making the atmosphere around two terminals that are objects to be welded together (i.e., welding objects) an inert gas atmosphere, giving the welding objects a ground potential, and applying a predetermined high-voltage pulse between the ground potential and a tungsten electrode that is near the welding objects to increase the temperature of the welding objects.

Figure 3:
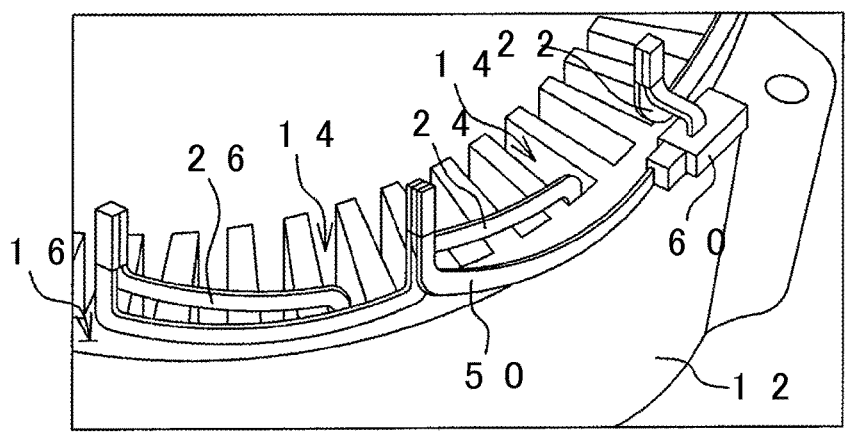
FIG. 3 is a view showing neutral point connecting portions pulled out from the phase windings, connected by the neutral line, in the stator for the rotary electric machine according to the example embodiment of the invention.
Figure 4:
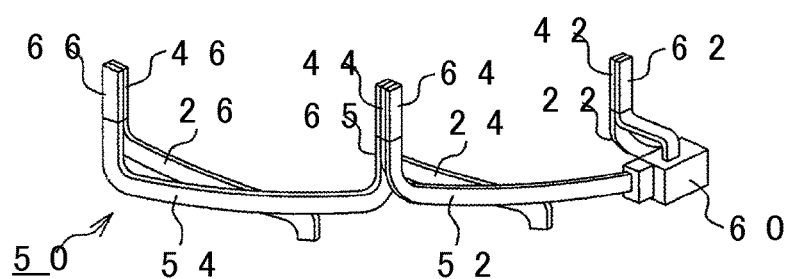
FIG. 4 is a detailed view taken from FIG. 3, of the connection relationship between neutral point connecting portions of the phase windings and portions of the neutral line where an insulation coating has been removed.

FIG. 3 is a view showing the U-phase winding 22, the V-phase winding 24, and the W-phase winding 26 that are connected to the neutral line 50, removed from FIG. 1. FIG. 4 is a view of the neutral line 50, and the U-phase winding 22, the V-phase winding 24, and the W-phase winding 26 that are connected to the neutral line 50, with the stator core 12 and the slots 14 omitted from FIG. 3.

As shown in FIG. 4, the insulation-coating removed portion 62 of the UV connecting wire 52 is connected to the neutral point connecting portion 42 of the U-phase winding 22, and the insulation-coating removed portion 64 is connected to the neutral point connecting portion 44 of the V-phase winding 24. The insulation-coating removed portion 65 of the VW connecting wire 54 is connected to the neutral point connecting portion 44 of the V-phase winding 24, and the insulation-coating removed portion 66 is connected to the neutral point connecting portion 46 of the W-phase winding 26.

In FIG. 4, the UV connecting wire 52 and the VW connecting wire 54 are formed by separate insulation-covered conductors, and the UV connecting wire 52 and the VW connecting wire 54 are arranged sandwiching the neutral point connecting portion 44 of the V-phase winding 24. That is, the insulation-coating removed portion 64 of the UV connecting wire 52 is arranged on a side surface on one side of the neutral point connecting portion 44 of the V-phase winding 24, and the insulation-coating removed portion 65 of the VW connecting wire 54 is arranged a side surface on the opposite side of the neutral point connecting portion 44. All three of the insulation-coating removed portion 64, the neutral point connecting portion 44, and the insulation-coating removed portion 65 are integrally connected by TIG welding.

Instead of this, the UV connecting wire 52 and the VW connecting wire 54 may be formed by a single insulation-coated conductor, and this single insulation-coated conductor may be bent so as to sandwich the neutral point connecting portion 44 of the V-phase winding 24, with a side on one side of the bend serving as the UV connecting wire 52, and the side on the other side of the bend serving as the VW connecting wire 54. In this case, because the structure is a bent structure, the insulation-coating removed length at the bend is that shown in FIG. 4 (i.e., the length of the insulation-coating removed portion 64+the length of the insulation-coating removed portion 65), which is twice the insulation-coating removed length of other locations.

A temperature sensor 60 in FIGS. 1, 3, and 4 is neutral point temperature detecting means provided on the neutral line 50, for estimating a temperature of the phase windings 20.

As shown in FIG. 4, the neutral line 50 is connected and arranged in a state floating between the neutral point connecting portion 42 of the U-phase winding 22, the neutral point connecting portion 44 of the V-phase winding 24, and the neutral point connecting portion 46 of the W-phase winding 26, which have been pulled out from the phase windings 20. The neutral point connecting portions 42, 44, and 46 are free ends of the conductor segments, so the neutral line 50 is connected and arranged in a floating state between two free ends. The resonant frequency of the portion of the neutral line 50 that is connected in this floating state is a frequency that is lower than a natural frequency of vibration of the stator core 12 and a natural frequency of vibration of an assembly of the phase windings 20 wound around the stator core 12.

In a hybrid vehicle provided with an engine and a rotary electric machine, as an example, the natural frequency of vibration of the stator core 12 and the natural frequency of vibration of an assembly of the phase windings 20 wound around the stator core 12 is approximately 500 to 1,000 kHz. In contrast, the resonant frequency of the portion of the neutral line 50 that is floating of the structure shown in FIG. 4 is approximately 200 kHz or less. A secondary frequency of vibration from firing/combustion when the maximum speed of a four cylinder engine of the hybrid vehicle is 5,000 rpm is 375 kHz, so the portion of the neutral line 50 that is floating in FIG. 4 resonates at the secondary frequency of vibration from the firing/combustion of the engine.

Figure 5:
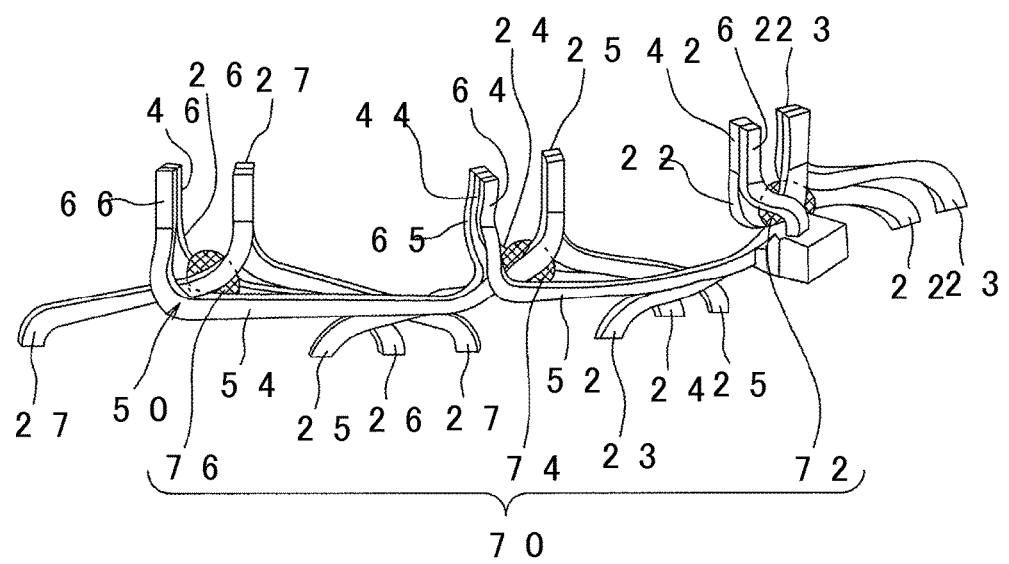
FIG. 5 is a view of the arrangement position of a fixing portion that increases a resonant frequency of vibration of a portion of the neutral line, in the stator for the rotary electric machine according to the example embodiment of the invention.

FIG. 5 is a view of a structure that increases the resonant frequency of the portion of the neutral line 50 by providing a fixing portion 70 that fixes the neutral line 50 to the stator core 12, because the natural frequency of vibration of an assembly of the phase windings 20 that are wound around the stator core 12 is high. FIG. 5 shows the U-phase winding 23, the V-phase winding 25, and the W-phase winding 27 that are each moved over one slot and wound from the U-phase winding 22, the V-phase winding 24, and the W-phase winding 26, respectively, in addition to the windings and the like shown FIG. 4. The phase windings 20 corresponding to the U-phase windings 22 and 23, the V-phase windings 24 and 25, and the W-phase windings 26 and 27 shown in FIG. 5 are circled in FIG. 1.

The fixing portion 70 is preferably provided in a position such that the neutral line 50 is fixed to the coil end 28 of each phase winding group wound around the stator core 12. The U-phase winding 22, the V-phase winding 24, and the W-phase winding 26 that are directly connected to the neutral line 50 are already welded to the insulation-coating removed portions 62, 64, 65, and 66 of the neutral line 50, so even if the U-phase winding 22 and the V-phase winding 24 are connected to the UV connecting wire 52 of the neutral line 50, they will simply reinforce the weld, and similarly, even if the V-phase winding 24 and the W-phase winding 26 are connected to the VW connecting wire 54 of the neutral line 50, they will simply reinforce the weld, and will not contribute much to improving the resonant frequency of the portion of the neutral line 50. Therefore, the U-phase winding 22 that is connected to the neutral line 50 is fixed to the U-phase winding 23 that is adjacent to this U-phase winding 22 by the fixing portion 70, the V-phase winding 24 that is connected to the neutral line 50 is fixed to the V-phase winding 25 that is adjacent to this V-phase winding 24 by the fixing portion 70, and the W-phase winding 26 that is connected to the neutral line 50 is fixed to the W-phase winding 27 that is adjacent to this W-phase winding 26 by the fixing portion 70. These three fixing portions 70 are differentiated and referred to as adhesive fixing portions 72, 74, and 76 in FIG. 5.

In the example in FIG. 5, the U-phase winding 22 having, as a tip end, the neutral point connecting portion 42 that is welded to the insulation-coating removed portion 62 that is one end of the UV connecting wire 52 of the neutral line 50, is fixed to the U-phase winding 23 that is adjacent to this U-phase winding 22 by the adhesive fixing portion 72. As a result, the neutral point connecting portion 42 that has been pulled out from the U-phase winding 22 and was a free end, is fixed at its base to the coil end 28 of each phase winding group that is wound around the stator core 12, so the neutral line 50 that is connected to the neutral point connecting portion 42 is firmly inhibited from vibrating due to resonance. In this way, the adhesive fixing portion 72 fixes, via the U-phase winding 22, the neutral line 50 to the coil end 28 that has a high natural frequency.

Similarly, the V-phase winding 24 having, as a tip end, the neutral point connecting portion 44 that is sandwiched by, and welded to, the insulation-coating removed portion 64 that is the other end of the UV connecting wire 52 of the neutral line 50, and the insulation-coating removed portion 65 that is one end of the VW connecting wire 54 of the neutral line 50, is fixed to the V-phase winding 25 that is adjacent to this V-phase winding 24 by the adhesive fixing portion 74. Also, the W-phase winding 26 having, as a tip end, the neutral point connecting portion 46 that is welded to the insulation-coating removed portion 66 that is the other end of the VW connecting wire 54 of the neutral line 50, is fixed to the W-phase winding 27 that is adjacent to this W-phase winding 26 by the adhesive fixing portion 76.

In this way, the neutral line 50 is fixed to the coil end 28 that has a high natural frequency, by the fixing portion 70 that includes the adhesive fixing portions 72, 74, and 76. As a result, the resonant frequency of the portion of the neutral line 50 can be increased to approximately 400 kHz or more, so the portion of the neutral line 50 will no longer resonate at the frequency of 375 kHz from combustion/firing of the engine.

FIGS. 6 to 9 are views of different configurations of the fixing portion 70. The three adhesive fixing portions 72, 74, and 76 that form the fixing portion 70 differ only with regard to their positions with respect to the stator core 12, and are otherwise the same, so only the adhesive fixing portion 76 will be described below.

Figure 6:
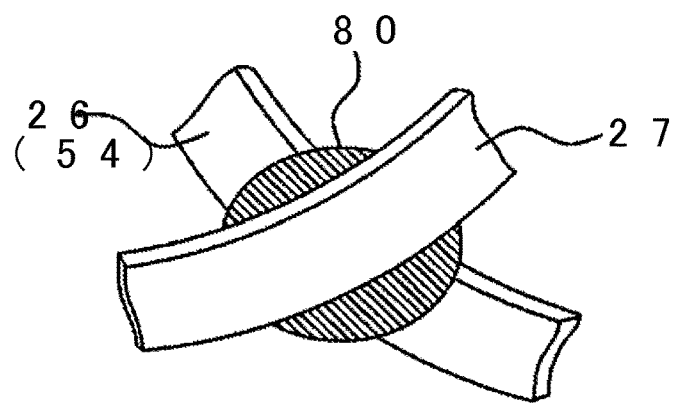
FIG. 6 is a partial enlarged view of FIG. 5, showing an example of the fixing portion.

FIG. 6 is a view of an example in which a high viscosity adhesive 80 is used as the adhesive fixing portion 76. The high viscosity adhesive 80 is adhesive having high enough viscosity that it will not run down even if provided between adjacent W-phase windings 26 and 27. For example, a two-part epoxy resin or the like used applied to the connecting portion may be used as the high viscosity adhesive 80. The high viscosity adhesive 80 has low fluidity, is easy to handle, and can be precisely arranged in a predetermined adhering location. The high viscosity adhesive 80 solidifies when a curing time has passes, and firmly fixes and connects the adjacent W-phase windings 26 and 27 together.

Figure 7:
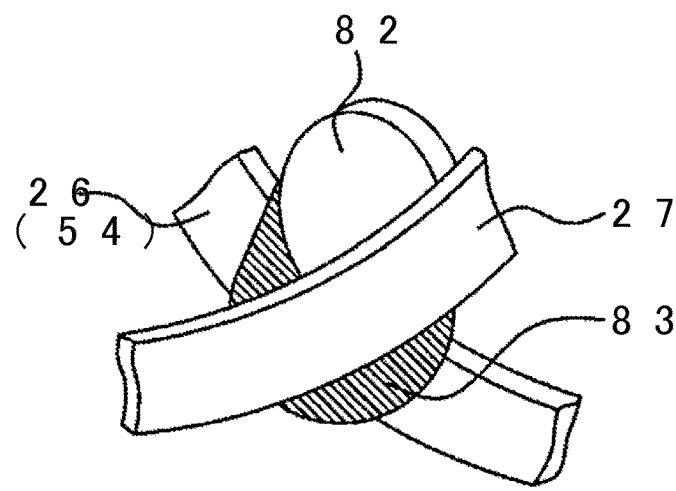
FIG. 7 is a partial enlarged view of FIG. 5, showing a fixing portion different from that shown in FIG. 6.

FIG. 7 is a view of an example in which a tablet adhesive 82 that is in a solid state at room temperature and fluidizes when heated is used as the adhesive fixing portion 76. Resin formed in a tablet shape, which melts at a temperature equal to or higher than approximately 100° C. and cures at a temperature above approximately 150° C., may be used as the tablet adhesive 82. Resin that cures after approximately 20 minutes at approximately 170° C., for example, as the curing conditions is preferably used. At room temperature, the tablet adhesive 82 is solid and is thus easy to handle, and can be precisely arranged in a predetermined adhering location such as in the space between adjacent W-phase windings 26 and 27. Then the tablet adhesive 82 is heated and melted, and then kept at the curing condition temperature so as to form a hardened adhesive part 83 that firmly fixes and connects the adjacent W-phase windings 26 and 27 together.

Figure 8:
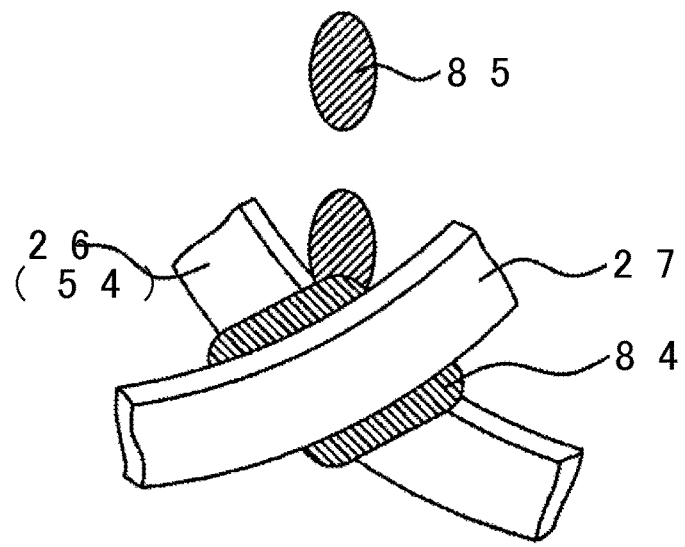
FIG. 8 is a partial enlarged view of FIG. 5, showing an example of another fixing portion that is different from those shown in FIGS. 6 and 7.

FIG. 8 is a view of an example in which a cloth tube 84 arranged between adjacent phase windings, and a low viscosity adhesive 85 that this cloth-like tube 84 is impregnated with, are used as the adhesive fixing portion 76. The cloth tube 84 is a mesh tube that is arranged between adjacent W-phase windings 26 and 27. In the example in FIG. 8, the cloth tube 84 is fit over the outside of the W-phase winding 26 so as to contact the W-phase winding 27. The cloth tube 84 may also be fit over the W-phase winding 27, or fit over both of the W-phase windings 26 and 27. Cylindrical non-woven fabric may be used for the cloth tube 84. By using the cloth tube 84, even if the low viscosity adhesive 85 drips down between adjacent W-phase windings 26 and 27, it will be absorbed by the cloth tube 84 and will not run down. The cloth tube 84 that has been impregnated with the low viscosity adhesive 85 beforehand may be fit over the W-phase winding 26. The impregnated low viscosity adhesive hardens when a curing time passes, and firmly fixes and connects the adjacent W-phase windings 26 and 27 together. Varnish or the like used to assemble the stator 10 may be used as the low viscosity adhesive.

Figure 9:
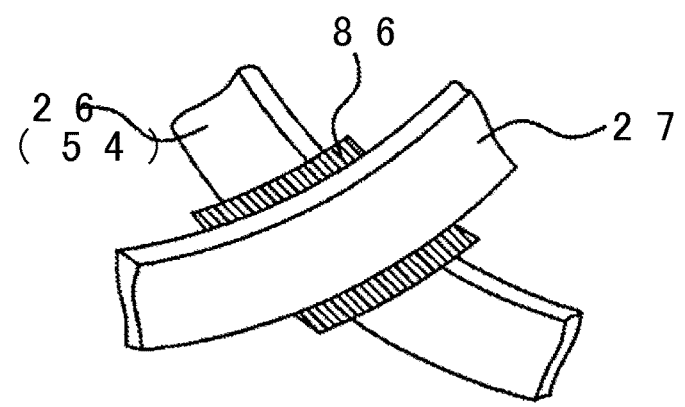
FIG. 9 is a partial enlarged view of FIG. 5, showing an example of another fixing portion that is different from those shown in FIGS. 6 to 8.

FIG. 9 is a view of an example in which a sheet member 86 that is in a solid state at room temperature and melts and cures when heated, is used as the adhesive fixing portion 76. The sheet member 86 has an thin sheet-like outer shape, in contrast to the tablet adhesive 82 described with reference to FIG. 7, which has a small disc-like outer shape. Resin that melts at a temperature equal to or higher than approximately 100° C. and cures at a temperature above approximately 150° C., similar to the tablet adhesive 82, but which is formed in a sheet shape, may be used as the sheet member 86. Resin that cures after approximately 20 minutes at approximately 170° C., for example, as the curing conditions is preferably used. At room temperature, the sheet member 86 is solid and is thus easy to handle, and can be precisely arranged in a predetermined adhering location such as in the space between adjacent W-phase windings 26 and 27. Then the sheet member 86 is heated and melted, and then hardened by being kept at the curing condition temperature. As a result, the sheet member 86 firmly fixes and connects the adjacent W-phase windings 26 and 27 together.

What is claimed is:

1. A stator for a rotary electric machine, the stator comprising:
   a stator core including a yoke portion on an outer peripheral side of the stator core, the stator core having a plurality of slots on an inner peripheral side of the stator core, the slots being arranged in a circumferential direction;
   a plurality of phase windings wounded a plurality of times by a predetermined winding method crossing between the plurality of slots, one lead end of each phase winding being a neutral point connecting portion, and the one lead end being pulled out from an axially end portion of the stator core;
   a neutral line that connects the neutral point connecting portions of the phase windings of different phases together, the neutral line being separate from the phase windings; and
   a fixing portion that directly fixes a first portion of a first phase winding that is connected to the neutral line, and a second portion of the first phase winding that is adjacent to the first portion of the first phase winding together without an intervening structure.

2. The stator according to claim 1, wherein
   the fixing portion is a high viscosity adhesive which can be provided between the first portion and the second portion without running down.

3. The stator according to claim 1, wherein
   the fixing portion is a tablet adhesive that is in a solid state at room temperature, and fluidizes when heated.

4. The stator according to claim 1, wherein
   the fixing portion includes a low viscosity adhesive and a tube;
   the tube is arranged between the first portion and the second portion, and the tube is impregnated with the low viscosity adhesive.

5. The stator according to claim 1, wherein
   the fixing portion is a sheet member that is inserted between the first portion and the second portion; and
   the sheet member is in a solid state at room temperature, and melts when heated, and cures by being heated further.

6. The stator according to claim 1, wherein the fixing portion is connected only to the first portion and the second portion.

7. The stator according to claim 1, wherein
   the first portion of the first phase winding is in a first plane parallel to a second plane in which the second portion of the first phase winding is provided, and
   the fixing portion is provided between the first plane and the second plane.

8. The stator according to claim 1, wherein the neutral line sits radially above the first phase winding.

* * * * *